United States Patent
Mayo, Jr. et al.

(10) Patent No.: US 6,208,037 B1
(45) Date of Patent: Mar. 27, 2001

(54) WATERWHEEL-DRIVEN GENERATING ASSEMBLY

(76) Inventors: Howard A. Mayo, Jr., 2051 Log Cabin Rd., York, PA (US) 17404; Kenneth R. Broome, 100 Rocky Creek Rd., Woodside, CA (US) 94062

( * ) Notice: Subject to any disclaimer, the term of this patent is extended or adjusted under 35 U.S.C. 154(b) by 0 days.

(21) Appl. No.: 09/207,925

(22) Filed: Dec. 9, 1998

Related U.S. Application Data (60) Provisional application No. 60/069,102, filed on Dec. 10, 1997, and provisional application No. 60/095,437, filed on Aug. 5, 1998.

(51) Int. Cl.⁷ ............................... F03B 13/00; H02P 9/04
(52) U.S. Cl. ............................... 290/54; 290/42; 290/43; 290/53
(58) Field of Search ................................ 290/52, 54, 53, 290/55, 50

(56) References Cited

U.S. PATENT DOCUMENTS

| | | | |
|---|---|---|---|
| 833,361 | 10/1906 | Wilmore | 290/53 |
| 1,061,399 | 5/1913 | Osborne | 415/140 |
| 1,529,824 | 3/1925 | Adelmann | 415/906 |
| 2,097,286 | 10/1937 | McGee | 290/54 |
| 4,053,787 | 10/1977 | Diggs | 290/54 |
| 4,137,005 | 1/1979 | Comstock | 290/53 |
| 4,182,123 | * 1/1980 | Ueda | 60/325 |
| 4,224,793 | 9/1980 | Gutsfeld | 415/6 |
| 4,296,602 | 10/1981 | Hales et al. | 415/906 |
| 4,319,142 | * 3/1982 | Mayo, Jr. | 290/52 |
| 4,324,984 | * 4/1982 | Borgen | 290/54 |
| 4,411,632 | * 10/1983 | Wuenscher | 440/93 |
| 4,511,808 | * 4/1985 | Jost | 290/54 |
| 4,764,313 | * 8/1988 | Cameron et al. | 290/54 |
| 4,843,249 | 6/1989 | Bussiere | 290/53 |
| 5,082,423 | 1/1992 | Morgan | 415/141 |
| 5,430,332 | * 7/1995 | Dunn, Jr. | 290/54 |
| 5,440,175 | 8/1995 | Mayo, Jr. et al. | 290/54 |

FOREIGN PATENT DOCUMENTS

| | | | |
|---|---|---|---|
| 2190144 | 11/1987 | (GB) | 415/202 |
| 62968 | 4/1982 | (JP) | 415/3.1 |

\* cited by examiner

*Primary Examiner*—Elvin Enad
(74) *Attorney, Agent, or Firm*—Aquilino, Welsh & Flaxman (57) ABSTRACT

An electric power-generating assembly is disclosed. The assembly includes a sill wall constructed within the bed of the waterway and at least one waterwheel-driven generating unit supported directly downstream of the sill wall. The waterwheel generating unit includes a waterwheel, a chute and an electric generating unit. The electric generator unit is mounted axially within the waterwheel and includes a rotor disposed axially within a stator and drive means operably connecting the waterwheel to the rotor.

19 Claims, 9 Drawing Sheets

WATERWHEEL-DRIVEN GENERATING ASSEMBLY

CROSS-REFERENCE TO RELATED APPLICATIONS

This U.S. Patent Application is based upon U.S. Provisional Patent Application Ser. No. 60/069,102, filed Dec. 10, 1997, entitled "WATERWHEEL-DRIVEN GENERATING ASSEMBLY" and U.S. Provisional Patent Application Ser. No. 60/095,437, filed Aug. 5, 1998, entitled "WATERWHEEL-DRIVEN GENERATING UNIT".

BACKGROUND OF THE INVENTION

1. Field of the Invention

The invention relates to waterwheel-driven generating assemblies. More particularly, the invention relates to waterwheel-driven generating assemblies adapted for application at locations without an existing dam. The invention further relates to a waterwheel-driven generating unit operating in an overshot or pitchback mode and including booster jets directing streams of high pressure water against the buckets of the wheel near their lowest point.

2. Description of the Prior Art

This invention pertains, in general, to waterwheels containing a speed-increaser gear unit and an electric generator internally contained within the waterwheel. One waterwheel-drive generating unit known to the public is disclosed in the inventors' own U.S. Pat. No. 5,440,175, entitled "Waterwheel-Driven Generating Unit", to Mayo, Jr. et al., which is incorporated herein by reference.

At present and in the recent past, hydroelectric installations using low-head dam sites, such as those typically less than 15 feet when measured vertically from headwater to tailwater, have generally been unable to economically develop commercial power. The limited number of installations of this type which have been developed had either a subsidy, special power rates, very unusual site conditions, or proved to be economic failures. The hydraulic turbines currently being manufactured are usually custom-designed and are very expensive per unit of power output due to their complex designs which require such items as trash racks, flume or penstock, intake gate, speed-increaser and generator, powerhouse, tailrace and possibly other auxiliary equipment. Existing dams are typically most economical to develop but they also require either an opening through or around the dam or a syphon intake. Each of these items adds substantially to the cost.

As the inventors' own U.S. Pat. No. 5,440,175 shows, attempts have been made to overcome the limitations of the prior art as discussed above. However, no solution has been provided to address the use of waterwheel-driven generating assemblies at locations having no existing dam. The present invention provides a solution to the need for waterwheel-driven generating units at locations having no existing dam.

SUMMARY OF THE INVENTION

It is, therefore, an object of the present invention to provide an electric power-generating assembly adapted for application at waterway locations without an existing dam. The assembly includes a sill wall constructed within the bed of the waterway and at least one waterwheel-driven generating unit supported directly downstream of the sill wall. The waterwheel generating unit includes a waterwheel, a chute and an electric generating unit. The electric generator unit is mounted axially within the waterwheel and includes a rotor disposed axially within a stator and drive means operably connecting the waterwheel to the rotor. In addition, the chute includes an upstream end pivotally secured to the sill wall and a downstream end supported on the waterwheel, wherein the downstream end of the chute clears the circular path defined by an outer edge of the waterwheel when the waterwheel is rotating.

It is also an object of the present invention to provide an electric power generating assembly wherein the downstream end of the chute includes wheels which ride upon the waterwheel.

It is another object of the present invention to provide an electric power generating assembly wherein the waterwheel-driven generating unit includes a shroud secured adjacent a downstream side of the waterwheel.

It is a further object of the present invention to provide an electric power generating assembly including means for selectively lifting the waterwheel-driven generating unit.

It is also an object of the present invention to provide an electric power generating assembly wherein the means for selectively lifting includes a guide frame which selectively raises and lowers the waterwheel to control the volume of water entering the waterwheel.

It is another object of the present invention to provide an electric power generating assembly wherein the guide frame selectively lifts the waterwheels between a fully raised position where no water flows onto the waterwheel and a fully lowered position where the waterwheel is inoperative.

It is a further object of the present invention to provide an electric power generating assembly wherein components of the electric generating unit are supported by a carriage sealed within the waterwheel, and the carriage may be withdrawn from the waterwheel.

It is also an object of the present invention to provide an electric power generating assembly wherein the carriage is supported for movement on a runway rail mounted within the waterwheel.

It is another object of the present invention to provide an electric power generating assembly wherein the components include a speed increaser and a generator.

It is a further object of the present invention to provide an electric power generating assembly wherein the waterwheel-driven generating unit includes a booster jet.

It is also an object of the present invention to provide an electric power generating assembly wherein the waterwheel-driven generating unit operates in an overshot mode.

It is another object of the present invention to provide an electric power generating assembly wherein the waterwheel-driven generating unit operates in a pitchback mode.

It is a further object of the present invention to provide a waterwheel-driven generating unit wherein the guide frame includes first and second columns coupled to opposite ends of the waterwheel.

It is also an object of the present invention to provide a waterwheel-driven generating unit wherein the carriage is supported for movement on a runway rail mounted within the waterwheel such that the carriage moves through the watertight door onto an external runway.

It is a further object of the present invention to provide a waterwheel-driven generating unit wherein the booster jet includes a spring loaded adjustment sleeve attached to a first end of the booster jet for maintaining the booster jet adjacent the water wheel.

Other objects and advantages of the present invention will become apparent from the following detailed description when viewed in conjunction with the accompanying drawings, which set forth certain embodiments of the invention.

DESCRIPTION OF THE PREFERRED EMBODIMENTS

The detailed embodiments of the present invention are disclosed herein. It should be understood, however, that the disclosed embodiments are merely exemplary of the invention, which may be embodied in various forms. Therefore, the details disclosed herein are not to be interpreted as limited, but merely as the basis for teaching one skilled in the art how to make and/or use the invention.

Figure 1:
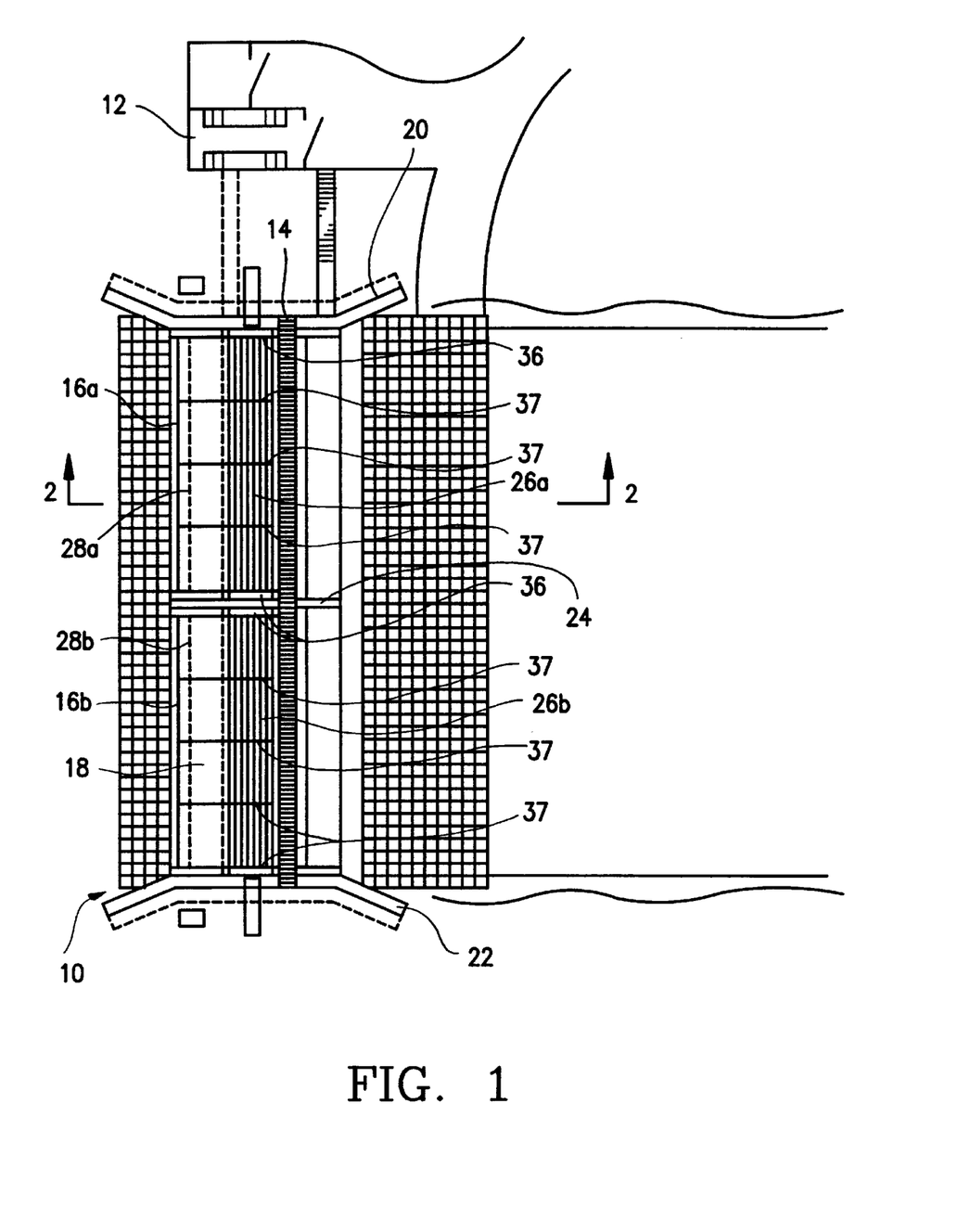
FIG. 1 is a plan view of the present waterwheel-driven generating assembly installed at a river site.
Figure 2:
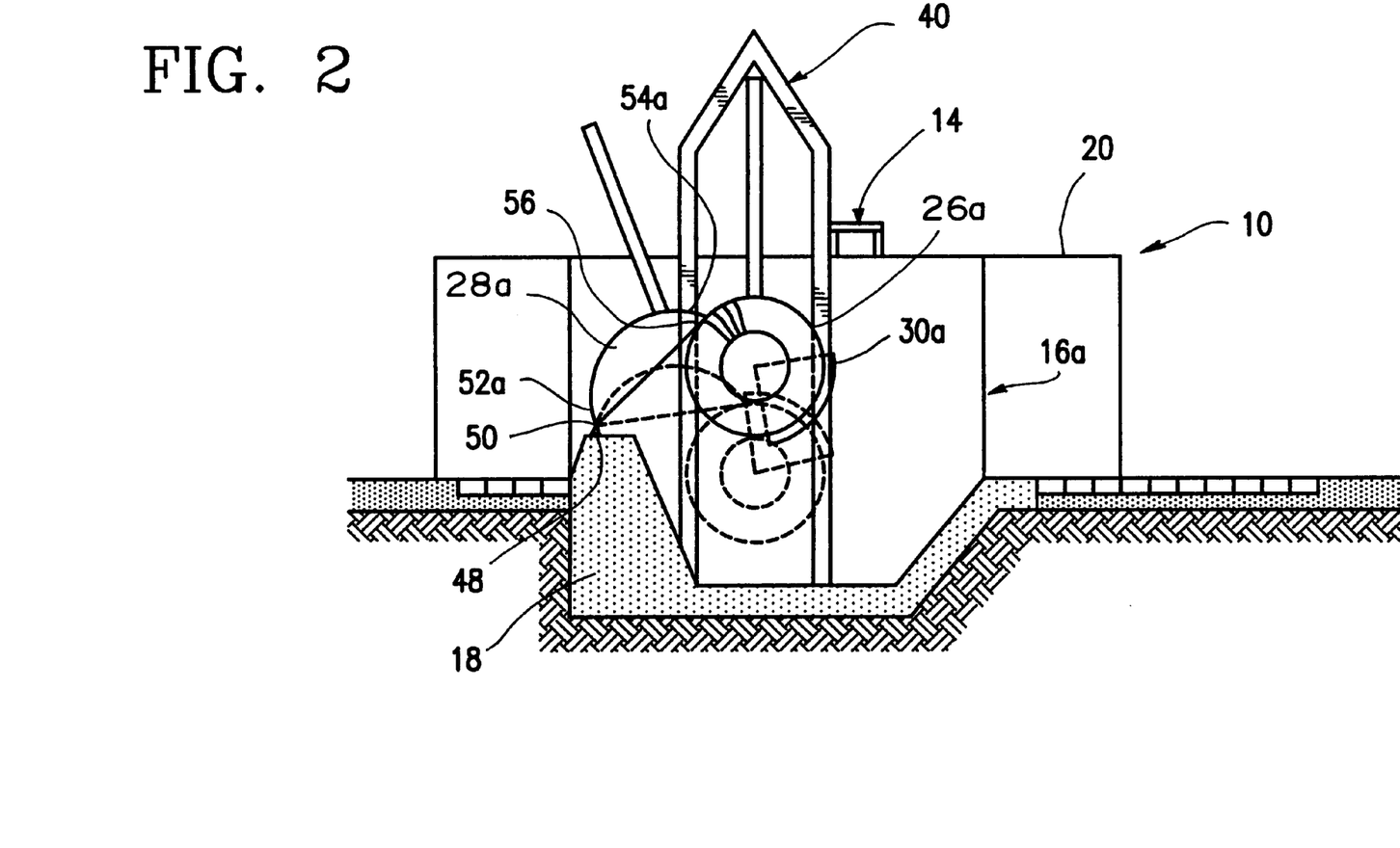
FIG. 2 is a cross sectional view along the line II—II of the waterwheel-driven generating assembly as shown in FIG. 1.
Figure 3:
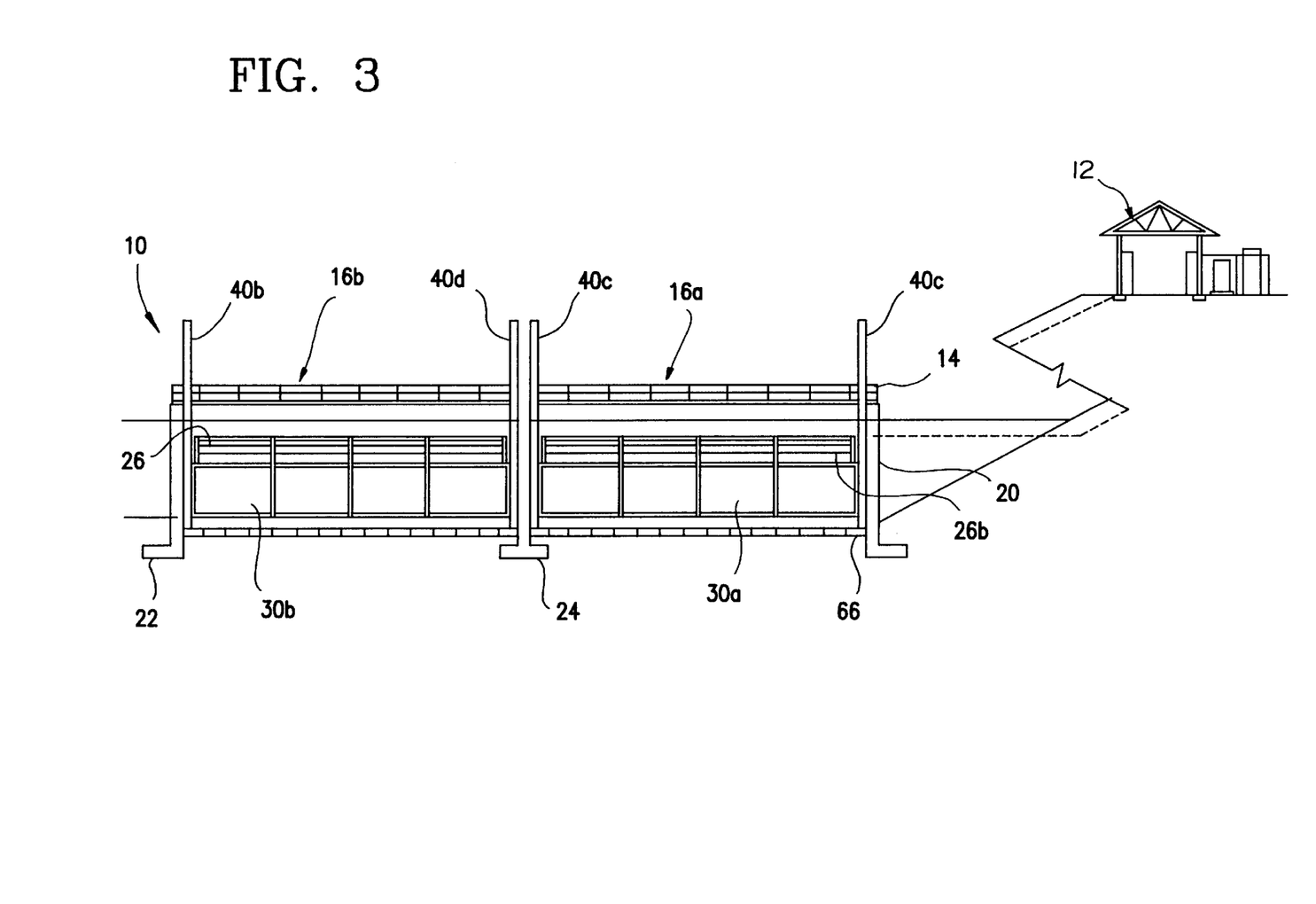
FIG. 3 is a downstream elevation view of the present waterwheel-driven generating assembly.

With reference to FIGS. 1–3, a waterwheel-driven generating assembly 10 adapted for application at locations without an existing dam is disclosed. The waterwheel-driven generating assembly 10 includes an associated control center 12 and walkway 14. In addition, other necessary accessories may be employed with the waterwheel-driven generating assembly 10, without departing from the spirit of the present invention. The present waterwheel-driven generating assembly 10 permits application at locations without a dam, where the installation of the waterwheel-driven generating assembly 10 will not cause upstream flooding during normal flow and operating conditions. The present waterwheel-driven generating assembly 10 also permits application at locations without a dam, where the waterwheel-driven generating assembly 10 will not cause any significant increase in the upstream water elevations when the waterwheels are lowered and flood flow occurs.

As shown, the waterwheel-driven generating assembly 10 includes first and second waterwheel-driven generating units 16a, 16b installed on a low concrete sill wall 18. The sill wall 18 is constructed across a river bed between a first concrete abutment 20 positioned on a first riverbank and a second concrete abutment 22 positioned on the opposite second riverbank. A concrete dividing wall 24 is provided in the center of the river. The concrete dividing wall 24 is positioned and constructed to separate and support one end of each of the first and second waterwheel-driven generating units 16a, 16b. While the disclosed embodiment employs two waterwheel-driven generating units, a single unit or additional units may be employed without departing from the spirit of the present invention.

Each waterwheel-driven generating unit 16a, 16b is provided with a waterwheel, a chute and a shroud. The embodiment disclosed in FIGS. 1–3 includes a first waterwheel-driven generating unit 16a including a first waterwheel 26a, a first chute 28a and a first shroud 30a, and a second waterwheel-driven generating unit 16b which includes a second waterwheel 26b, a second chute 28b and a second shroud 30b.

Figure 4:
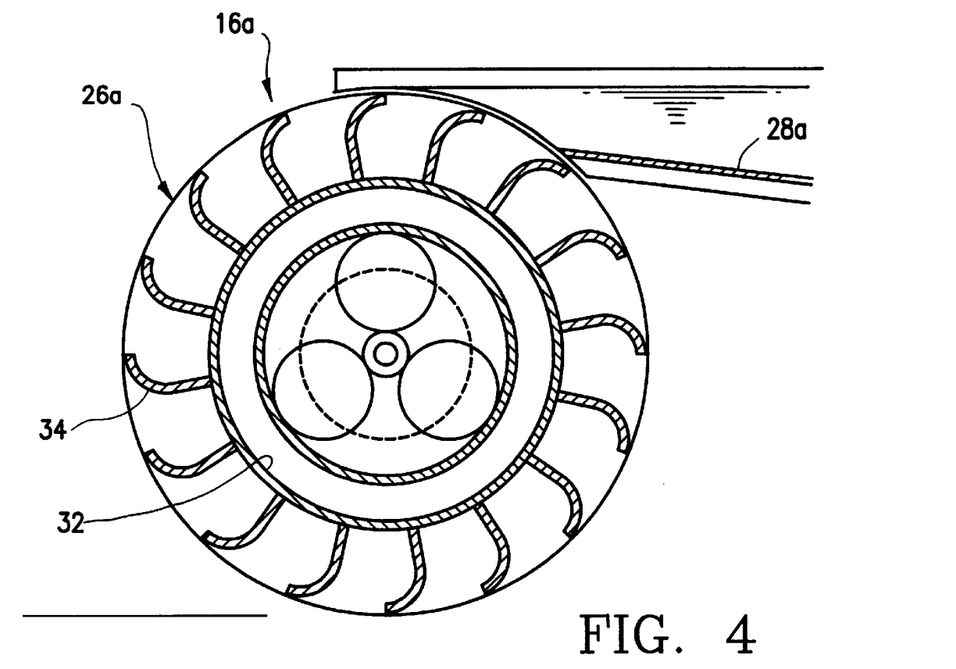
FIG. 4 is a cross sectional view of the waterwheel used in accordance with the present invention.
Figure 5:
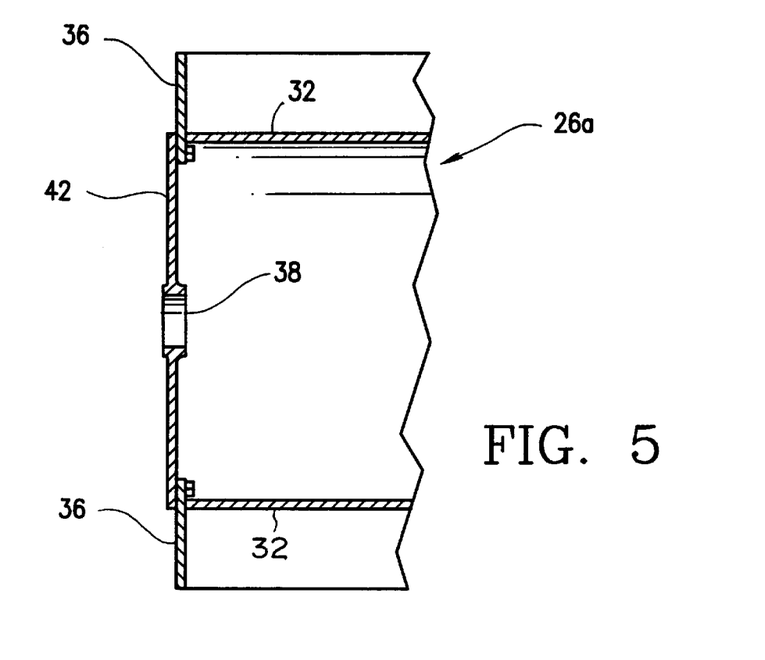
FIG. 5 is a detailed cross sectional view showing one embodiment for the end structure of the waterwheel including trunions.

With reference to FIGS. 4 and 5, an embodiment of the first waterwheel 26a is disclosed in detail. While the first waterwheel 26a is described herein, it should be understood that the second waterwheel 26b may be identical. The waterwheel 26a is operable between headwater and tailwater and comprises a metal cylinder 32 surrounded by multiple sets of buckets 34. The buckets 34 are fixedly attached along one edge to the cylinder and are also attached and sealed at each end by an end closure plate 36 and/or intermediate disc 37 (see FIG. 1). The waterwheel 26a may be constructed in any structurally-rigid length with rigidly-attached intermediate rings and/or discs 37 to increase the rigidity of cylinder 32 and buckets 34. In fact, the waterwheel 26a is constructed in much the same manner as the waterwheel disclosed in the inventors' own U.S. Pat. No. 5,440,175, which is incorporated herein by reference.

Internal reinforcing, not shown, may be added as necessary for additional stiffness. Trunnion bearings 38 are centrally-located at each end of the waterwheel and are connected to a lift framework 40 (see FIG. 6) that will be discussed in greater detail below. A watertight door 42 is attached to the flat circular plate 36. As will be discussed in greater detail below, the watertight door 42 facilitates internal access to the waterwheel 26a while preventing the entrance of water and debris. Within the cylinder 32 is a speed-increaser system 44 (see (FIG. 7) directly connected by suitable means to an electric generator 46. The detailed structures of the speed-increaser system 44 and the generator 46 are disclosed in the inventors' own U.S. Pat. No. 5,440,175, which is incorporated herein by reference.

Water flowing over the concrete sill wall 18 (see FIGS. 1–3) is directed onto the first waterwheel 26a by the first chute 28a, while water flowing over the concrete sill wall 18 is directed onto the second waterwheel 26b by the second chute 28b. In use, the first and second chutes 28a, 28b are each long and high enough to discharge water into the uppermost space between the buckets 34 of the waterwheels 26a, 26b, while also acting as a bottom hinged gate to resist pressure from the water upstream of the waterwheel-driven generating assembly 10.

The first chute 28a and the second chute 28b are hinged 48 to the top of the concrete sill wall 18 at positions upstream and adjacent the respective first waterwheel 26a and second waterwheel 26b. The first and second chutes 28a, 28b are pivotally secured to the concrete sill wall 18 such that they respectively move with the first and second waterwheels 26a, 26b. The general structure of the first and second chutes 28a, 28b is similar to the chute disclosed in the inventors' own U.S. Pat. No. 5,440,175, which is incorporated herein by reference. In addition, each end and lower edge of each chute is provided with a flexible seal 50 (see FIG. 2) that prevents water from breaking past the ends and lower edge of the chute. The surface of the concrete abutment walls 20, 22 and 24 are made true and smooth to achieve a watertight seal.

While the upstream edges 52a, 52b of the first and second chutes 28a, 28b are hinged to the concrete sill wall 18, the downstream edges 54a, 54b of the first and second chutes 28a, 28b are respectively supported on the first and second waterwheels 26a, 26b by grooved wheels 56 secured to the undersides of the first and second chutes 28a, 28b. The wheels 56 run on the edges of disks 37 formed transversely to the axis of the waterwheels 26a, 26b. The disks 37 are spaced at intervals along the waterwheels 26a, 26b and are positioned such that the wheels 58 of the chutes 28a, 28b ride thereon to support the downstream edges 54a, 54b of the first and second chutes 28a, 28b. In this way, supporting wheels 56 riding on the waterwheels 26a, 26b at a downstream position, in combination with a hinged mounting at the upstream position, allow the first and second chutes 28a, 28b to respectively follow the motion of the first and second waterwheels 26a, 26b.

Figure 7:
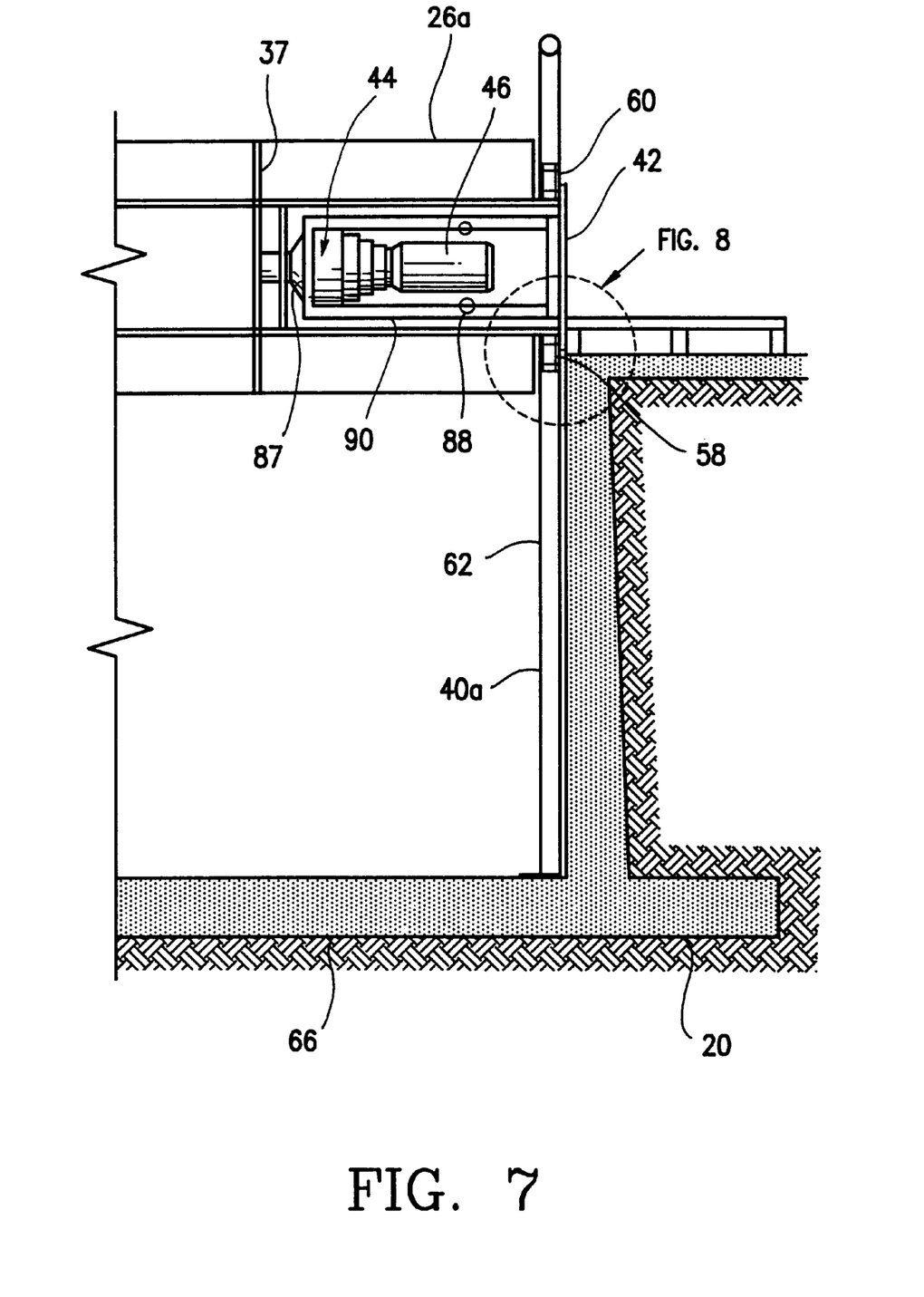
FIG. 7 is a cross sectional view along the line VII—VII of the lifting framework and hoist mechanism as shown in FIG. 6.
Figure 8:
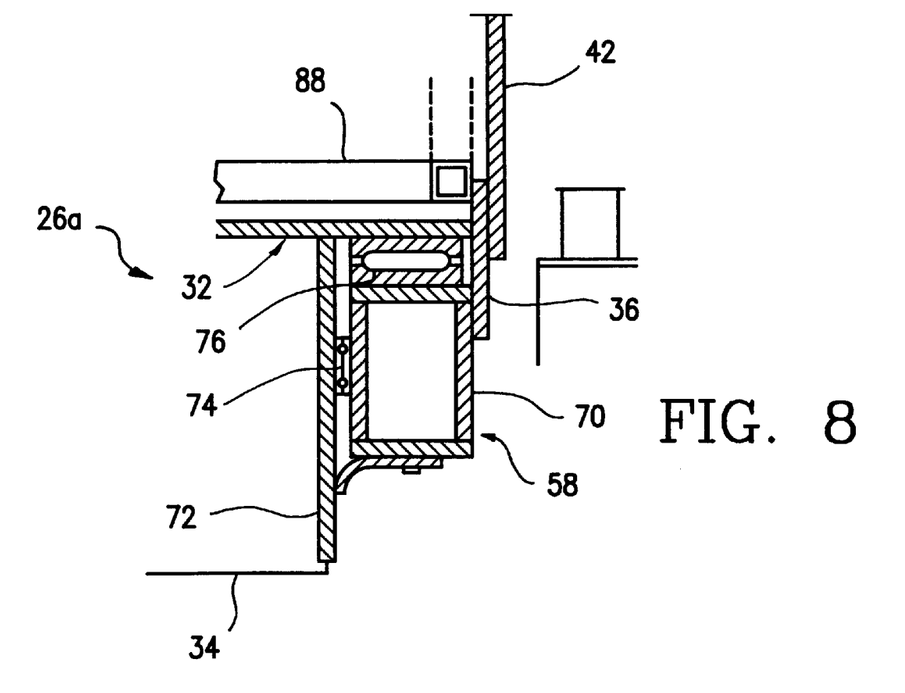
FIG. 8 is a detailed cross sectional view along the line VIII—VIII in FIG. 7 (alternate design, including rollers, to that shown in FIG. 5).
Figure 9:
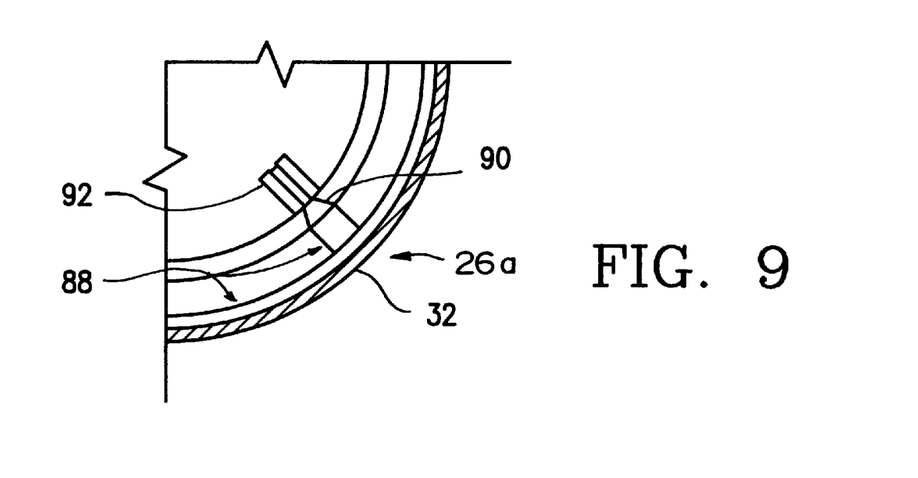
FIG. 9 is a detailed cross sectional view along the line IX—IX in FIG. 6.

As discussed above, each waterwheel-driven generating unit 16a, 16b is provided with a shroud 30a, 30b (see FIGS. 2 and 3) positioned by cable substantially along its downstream side. Each shroud 30a, 30b consists of a curved plate that extends the full length of the waterwheel 26a, 26b. The curved plate also extends vertically downward approximately 90° from about 10° above the horizontal centerline. The curvature has a radius slightly greater than that of the waterwheel. This provides sufficient clearance to prevent the shroud from rubbing the waterwheel when in operation. The shroud 30a, 30b is pivotally-attached to the outside face of the stationary ring girders 58 (discussed in greater detail below and shown in FIGS. 7 and 8) at each end of the waterwheel 26a, 26b by a curved box shaped track and steel rollers 76 (see FIG. 8).

The first and second waterwheel-driven generating units 16a, 16b are respectively supported by lifting frameworks 40a, 40b, 40c, 40d (see FIGS. 2 and 3), and an associated guide frame 60 (see FIG. 6), designed to selectively raise and lower the waterwheels 26a, 26b to control the volume of water entering the waterwheels 26a, 26b from the chutes 28a, 28b. When the waterwheels 26a, 26b are fully raised, no water flows onto the tops of waterwheels. When the waterwheels 26a, 26b are fully lowered, the waterwheels 26a, 26b are protected from flood flows and debris by the chutes 28a, 28b on the upstream side of the waterwheel-drive generating units 16a, 16b and the shrouds 28a, 28b on the downstream side of the waterwheel-drive generating units 16a, 16b. The waterwheel-drive generating units 16a, 16b are inoperative when in their fully lowered positions.

During normal operation, the waterwheel height is adjusted to develop maximum power output for the available discharge in the river. During inspection and maintenance periods, the waterwheels are fully raised to provide access to the electrical and mechanical equipment associated with each waterwheel-drive generating unit. When there is a warning of an impending flood, the waterwheels are fully lowered to protect the wheels and provide minimum obstruction to flood flows.

Referring to FIG. 3 and 6–9, the lifting frameworks 40a, 40b, 40c, 40d, and associated guide frame 60, are disclosed.

The first lifting framework 40a disclosed in FIGS. 6–9 is associated with the first abutment 20. However, a respective lifting framework is provided at each end of both the first and second waterwheel-drive generating units 16a, 16b. As such, a second lifting framework 40b is provided adjacent the second abutment 22, and first and second central lifting frameworks 40c, 40d are positioned on opposite sides of the central concrete dividing wall 24.

The lifting framework 40a includes a pair of cylindrical metal columns 62, 64 supporting the guide frame 60. The metal columns 62, 64 are mounted on the concrete foundation slab 66 adjacent to the first abutment 20, and extend substantially parallel to the first abutment 20. The columns 62, 64 are bolted at intervals to the concrete abutment 20 to provide lateral support. The metal columns 62, 64 position the guide frame 60 and the ring girder 58. The external ring girder 58 is mounted on the guide frame 60 located between the cylindrical metal columns 62, 64 to permit vertical movement of the guide frame 60 and the external ring girder 58, and the waterwheel-driven generating unit 16a. The guide frame 60 is, therefore, provided with Teflon faced guides shoes 68, or rollers, which ride around the cylindrical surface of the metal columns 62, 64 as the external ring girder 58 is moved up and down on the metal columns 62, 64.

The external ring girder 58 includes a stationary support ring 70 (see FIGS. 6 and 8) mounted on the guide frame 60 and a bearing housing 72 rotatably coupled to the stationary support ring 70. In use, the waterwheel 26a is coupled to the bearing housing 72 formed by the waterwheel metal cylinder 32 and closure plate 36 for rotation therewith. The bearing housing 72 includes ball bearings 74 and roller bearings 76 positioned between the stationary support ring 70 and a rotating ring closure plate 36 which is part of the waterwheel 26a. The bearing housing 72 permits the waterwheel 26a to freely rotate as the water flows through the waterwheel-driven unit 16a.

Figure 6:
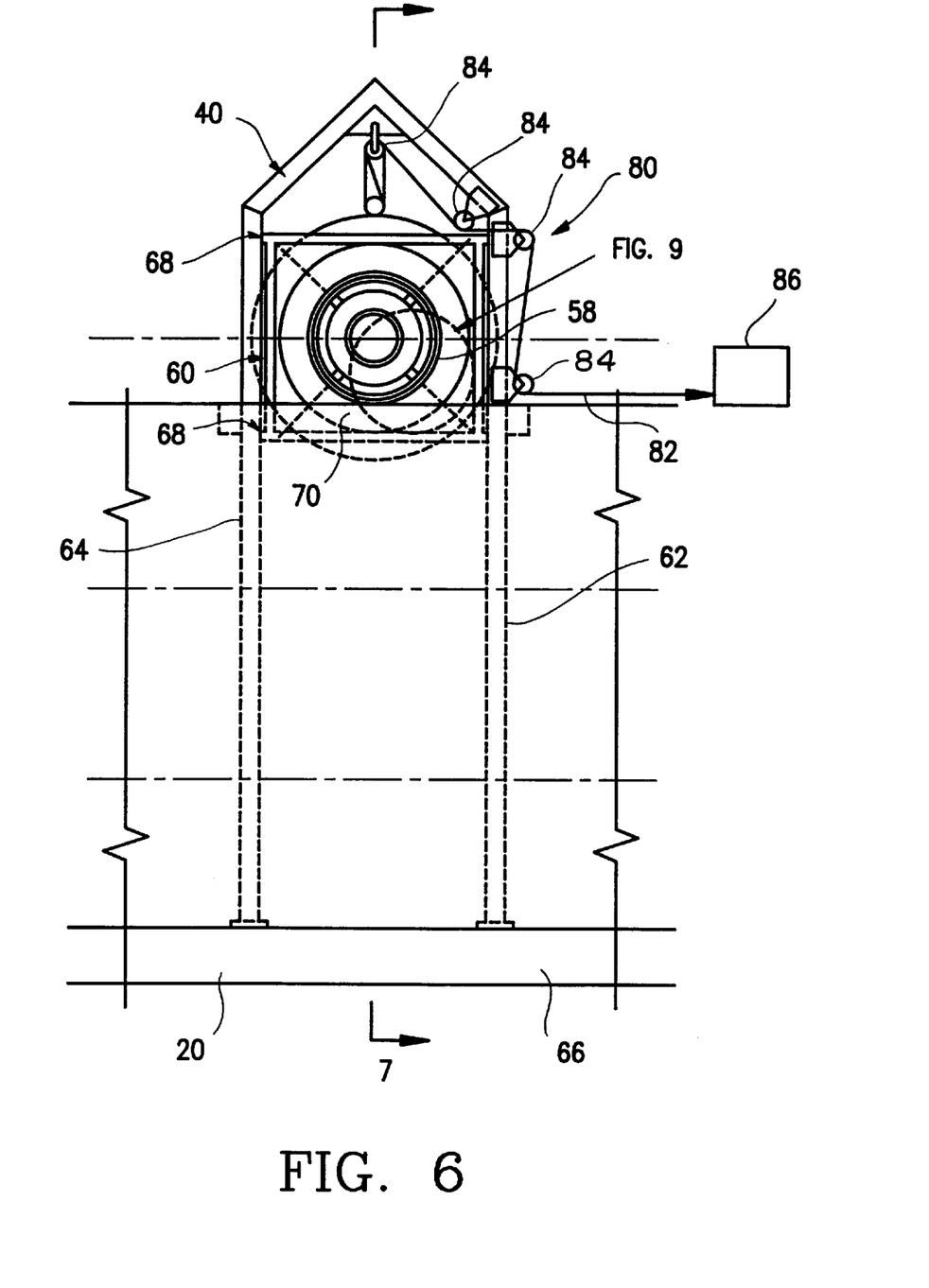
FIG. 6 is an end view showing the lifting framework and hoist mechanism in accordance with the present invention.

Vertical movement of the external ring girder 58, with guide frame 60 and the waterwheel-driven generating unit 16a, is controlled by a multi-part steel wire rope block and tackle 80 (see FIG. 6). The wire rope 82 is guided by a series of pulleys 84 leading to an electrically powered winch 86 from both ends of each waterwheel-driven generating unit 16a to assure simultaneous operation. In this way, the external ring girder 58 is selectively moved up and down.

The external ring girder 58 is connected to an end of a waterwheel 26a such that when the waterwheel 26a is at the top of its travel (see FIG. 7), a watertight door 42 in the end closure plate 36 of the waterwheel 26a may be removed and a wheeled carriage 87 (see FIGS. 7 and 9), supported by an internal frame 88, carrying the speed increaser 44 and generator 46 may be withdrawn for inspection and maintenance work. The wheeled carriage 87 is withdrawn with the help of a hand operated winch and wire rope block and tackle (not shown) that can operate in either direction.

During operation of the system, the internal frame 88 of the waterwheel 26a is supported by the external ring girder 58 at the outboard end and by the first transverse disk 37 at the inboard end. A runway rail 90 is installed at each side of the internal frame 88 to permit withdrawal of the electro mechanical equipment and transfer to a truck or support frame for inspection. As such, the equipment is provided with wheels 92 which ride on the runway rail 90. With this in mind, the internal framework 88 is designed to both support the weight of the speed increaser 44 and generator 46, and also to resist the torque applied to the equipment from the rotating waterwheel.

The present invention permits waterwheel-driver generating units to be applied at locations on natural rivers and man-made canals where no dam presently exists, but where the installation of such an invention will not cause a significant increase in water level upstream during normal flow and operating conditions. The present assembly also will not cause any significant increase in upstream water elevations when the waterwheels are lowered and flood flow occurs.

The present invention also provides a convenient and reliable system for supporting columns from the base of the concrete abutments at each river or canal bank and/or at any intermediate wall for the multi-unit installations. Use of the cylindrical shaped metal columns as both vertical load carrying members and guides in a horizontal direction, provides greater precision of location and assurance of safety factor than use of concrete projections in a remote area. In this way, the present invention employs an external frame able to support each end of a waterwheel and convey the load to the columns while allowing access to the end of the wheel for withdrawal of the electro mechanical equipment housed within the end of the waterwheel.

Figure 10:
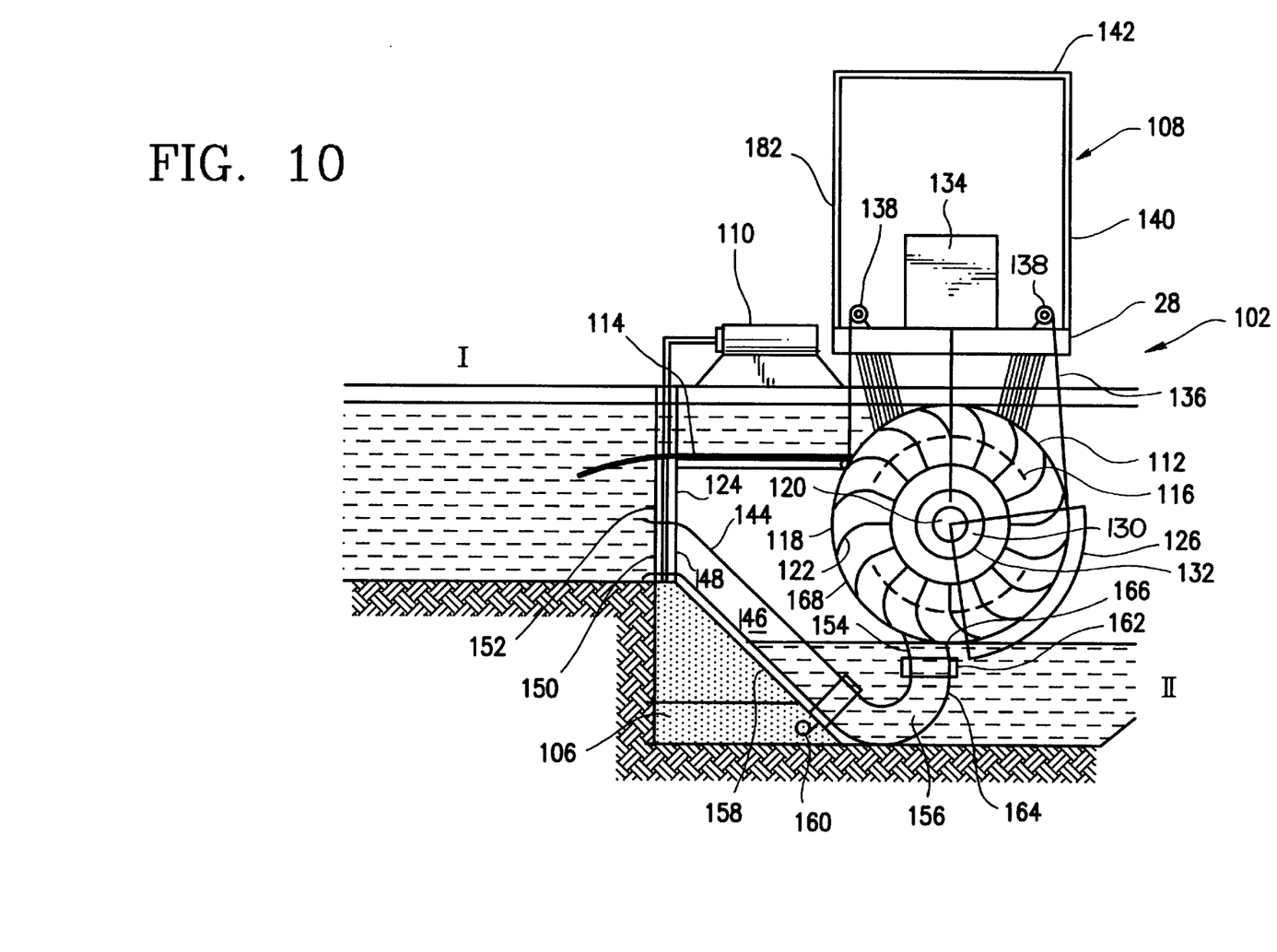
FIG. 10 is a sectional view of an alternate embodiment of the invention showing a waterwheel-driven generating unit operating in the overshot mode and utilizing booster jets having a telescopic sleeve which holds the nozzle to the conduit.

With reference to FIG. 10, and alternate embodiment of the present waterwheel-driven generating unit is disclosed. The disclosed waterwheel-driven generating unit 102 is installed downstream of a check structure in an irrigation canal. The present waterwheel-driven generating unit 102 is designed to be constructed at sights having concrete spillways, such as check structures in irrigation canals. However, the disclosed waterwheel-driven generating unit may be employed in a variety of applications without departing from the spirit of the present invention. The check structure includes removable wooden flash boards 124 located above a concrete spillway 106. A control center 134 and walkway 110 are associated with the waterwheel-driven generating unit 102. In addition, other necessary accessories may be employed with the waterwheel-driven generating unit 102, without departing from the spirit of the present invention.

The waterwheel-driven generating unit 102 includes a waterwheel 112 and an adjustable steel chute 114 attached to flashboards 124. The waterwheel 112 is constructed in much the same manner as the waterwheel disclosed in the inventors' own U.S. Pat. No. 5,440,175. The waterwheel 112 supports a plurality of curved buckets 116 positioned around the perimeter 118 of the waterwheel 112. The buckets 116 extend radially inwardly from the perimeter 118 of the waterwheel 112 toward the axis 120 of the waterwheel 112. The buckets 116 each have a concave surface 122 which faces opposite the waterflow direction, such that when water flows into the buckets 116 the buckets catch and hold the water while the waterwheel 112 rotates.

The steel chute 114 is attached to a weir 124 on top of the concrete spillway 106 such that the chute 114 may be adjusted to direct the flow of water onto the waterwheel buckets 116 at the top of the waterwheel's rotation. The general structure of the chute 114 is similar to the chute disclosed in the inventors' own U.S. Pat. No. 5,440,175. The water remains in the buckets 116 until the buckets 116 reach a point near the bottom of the waterwheel's rotation. At this point, the water falls from the buckets 116 into the canal below the waterwheel.

A steel shroud 126 surrounds a 90 degree section of the waterwheel 112 near the lower, downwardly rotating section of the waterwheel 112. The shroud 126 prevents water from spilling out of the waterwheel buckets 116 until the buckets reach a position at the bottom of the waterwheel's rotation. The general structure and operation of the shroud 126 is similar to the shroud disclosed in the inventors' own U.S. Pat. No. 5,440,175.

In addition to the above features, the waterwheel-driven generating unit 102 includes a steel frame platform 128 which holds a waterwheel 112, controls 134, cables 136, winches 138, fences 140, and a roof 142. The detailed structures of the speed-increaser system 130, the generator 132 and their respective operation are disclosed in the inventors' own U.S. Pat. No. 5,440,175.

Referring to FIG. 10, the disclosed waterwheel-driven generating unit 102 is an overshot mode waterwheel-driven generating unit. The waterwheel-driven generating unit 102 includes six booster jets 144 which direct streams of higher pressure water against the buckets 116 of the waterwheel 112 near the waterwheel's lowest point of travel. The configuration of each of the six booster jets 144 is identical. As such, although only one booster jet 144 is shown in the drawings, the following detailed description is applicable to each of the booster jets. In addition, although six booster jets are disclosed in the preferred embodiment, one or more booster jets may be employed without departing from the spirit of the present invention.

Each booster jet 144 comprises one or more conduits 146 which transports water entering the upper end 148 of the conduit 146 through a control gate 150 located in the plane 152 of the weir 124 on the concrete spillway 106. The booster jet 144 also comprises an adjustable vertical nozzle 154 located at the lower or downstream end 156 of the one or more conduits 146.

Each conduit 146 is preferably manufactured from steel. The one or more conduits 146 preferably have a total cross-sectional area of approximately one half the vertical sectional area under the waterwheel 112, and the control gate 150 has an effective water flow preventing area equal to or greater than the cross-sectional area of the conduit. While the preferred dimensions and materials are disclosed herein, it should be understood that the booster jet may vary, somewhat, without departing from the spirit of the present invention.

When assembled, the conduit 146 is secured to the sloping upper surface 158 of the concrete spillway 106. A plurality of steel bolts 160 and other commonly-used fastening hardware components secure the conduit 146 to the concrete spillway 106, although other suitable fastening methods and apparatuses may be used without departing from the spirit of the invention.

The booster jets 144 utilize a first configuration for adjusting the position of the booster jets 144 in relation to the fixed portion of the supply conduit 146. Adjustment maintains the elevation and direction of the booster jets 144 constant in relation to the position of the bottom of the waterwheel 112. Although shown with the overshot embodiment, use of this booster jet nozzle configuration is not strictly limited to use with overshot mode waterwheels.

The booster jet 144 includes a spring-loaded adjustment sleeve 162 which attaches the first end 164 of the adjustable vertical nozzle 154 to the lower end 156 of the conduit 146. The adjustment sleeve 162 is a spring-loaded telescopic sleeve which forces the vertical nozzle 154 toward the bottom of the waterwheel 112. Other spring-loaded sleeve configurations may be used without departing from the spirit of the invention.

The vertical nozzle 154 is positioned such that the second end 166 of the vertical nozzle 154 contacts the rim 168 of the waterwheel 112 near the lowest point of travel of the waterwheel 112. The force provided to the vertical nozzle 154 from the spring-loaded adjustable sleeve 162 keeps the second end 166 of the vertical nozzle 154 in contact with the waterwheel rim 168, ensuring that the position of the booster jets 144 with respect to the bottom of the waterwheel 112 remains constant.

In operation, water flows into the upper end 148 of the conduit 146 through the control gate 150 in the weir 124 above the concrete spillway 106. Water then flows through the conduit 146 and passes through the vertical nozzle 154 located at the lower end 156 of the conduit 146. The vertical nozzle 154 directs the stream of high pressure water against the waterwheel's buckets 116 near the waterwheel's lowest point of travel. The high pressure stream of water applies a force against the buckets 116 in addition to, and in the same direction as, the force applied to the buckets 116 simultaneously by the overshot water flowing against the buckets 116 at the top of the waterwheel's rotation plus the water weight acting on the downstream side. Thus, the booster jets 144 increase the amount of water pressure acting on the waterwheel 112, thereby increasing the cost effectiveness of the waterwheel-driven generating unit 102. Alternatively, the booster jets may be operated independent of water flowing over the waterwheel.

Figure 11:
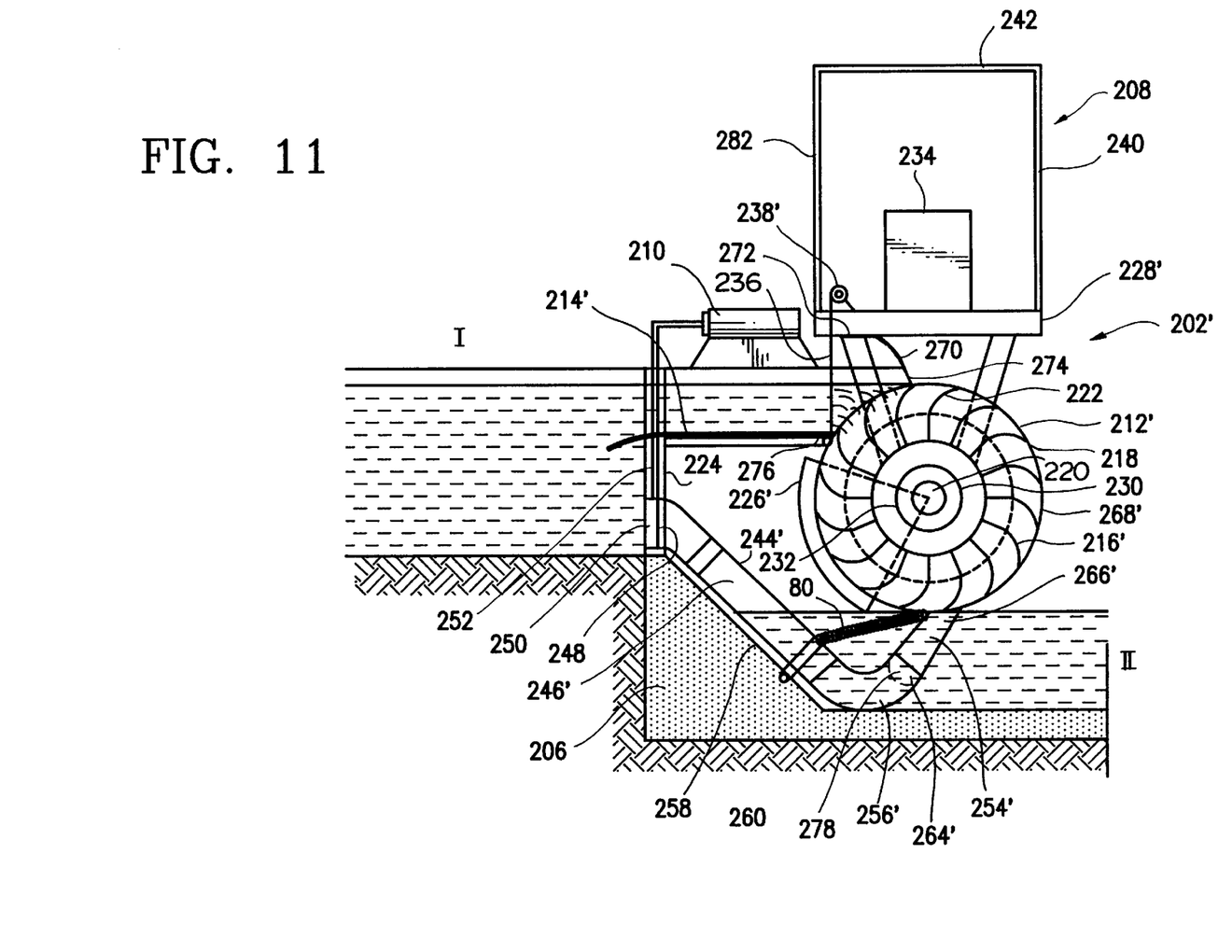
FIG. 11 is a sectional view of a further embodiment of the invention showing a waterwheel-driven generating unit operating in the pitchback mode and utilizing booster jets having a hinged joint which holds the nozzle to the conduit.

FIG. 11 shows a further configuration of the waterwheel-driven generating unit 202 wherein the waterwheel's direction of rotation is reversed. The waterwheel 212 operating in this mode is known to be operating in a pitchback mode. The basic configuration of the waterwheel-driven generating unit 202 is similar to the configuration of FIG. 10, with the exception of the following detailed additions and modifications.

Firstly, the waterwheel 212 is adjustably mounted such that it rotates in a pitchback direction. Thus, the top of the waterwheel 212 moves in a direction toward the upstream side of the waterwheel 212. Secondly, the waterwheel-driven generating unit 202 includes a deflectory plate 270 attached to the lower surface of the steel frame platform 228. The deflectory plate 270 is a concave, curved steel plate which has a length equal to the width of the waterwheel 212. The first edge 272 of the deflectory plate 270 is attached to the lower surface of the steel platform 228. The second edge 274 of the deflectory plate 270 protrudes downwardly into the flow of water, just downstream of the downstream edge of the chute 214.

Thirdly, the chute 214 in the pitchback embodiment is slightly modified, as compared to the chute in the overshot embodiment. In the pitchback embodiment, the downstream edge 276 of the chute 214 is curved downwardly to facilitate the transition of the water to a vertical direction. Water flowing over the adjustable chute 214 is deflected downwardly by the deflectory plate 270 such that the water flows against the waterwheel's buckets 216, forcing the waterwheel 212 to rotate in a reverse, or pitchback direction. A steel shroud 226, located near the lower section of the waterwheel's downward rotation, prevents water from flowing out of the buckets 216 until the buckets 216 reach a point near the lowest point of the waterwheel's rotation.

The pitchback embodiment of the waterwheel-driven generating unit 202 also includes one or more booster jets 244 which direct high pressure streams of water against the buckets 216 at the waterwheel's lowest point of rotation. The booster jets 244 utilize a second configuration for adjusting the position of the booster jets 244 in relation to the fixed portion of the supply conduit to maintain the elevation and direction of the jets constant in relation to the position of the bottom of the waterwheel 212. Although shown with the pitchback embodiment, use of this booster jet nozzle configuration is not strictly limited to use with the pitchback embodiment.

It should be understood that the following detailed description of one booster jet 244 configuration in this embodiment is typical of all booster jets 244 in this specific embodiment. The first end 264 of the vertical nozzle 254 is hingedly attached to the lower end 256 of the conduit 246. While FIG. 11 shows two fasteners 278, such as threaded fasteners and nuts or rivets, attaching the first end 264 of the nozzle 254 to the lower end 256 of the conduit 246, any suitable fastener providing hinged movement between the nozzle 254 and the conduit 246 may be used without departing from the scope of the invention.

A spring 280 connects the second end 266 of the vertical nozzle 254 to a point on the conduit upstream of the lower end 256 of the conduit 246, near the lower end 256 of the conduit 246. The spring 280 forces the second end 266 of the nozzle 254 close to the waterwheel rim 268, such that the waterwheel rim 268 rotates close to the second end 266 of the nozzle 254 as the waterwheel 212 rotates. The nozzle 254 is positioned close to the waterwheel 212 in a position such that the nozzle 254 directs a high pressure stream of water against the waterwheel buckets 216 at a location near the lowest point of the waterwheel's rotation.

The high pressure water stream simultaneously applies a pressure to the waterwheel buckets 216 in the same rotational direction as the pitchback water pressure applied to the buckets 216 at the top of the waterwheel 212. Thus, the pressure applied by the high pressure streams from the nozzle enhances the rotating pressure applied to the waterwheel 212 by the upper pitchback water pressure. This combined force results in a higher output waterwheel-driven generating unit. Additionally, in the pitchback mode, the discharge of both the upper pitchback water which acts upon the buckets 216 and the lower booster jet water stream which acts upon the buckets 216 is directed downstream. This downstream direction of water results in less build-up in the downstream water level and consequently increases the available driving force to generate power.

In operation, the waterwheel-driven generator unit 202 has maximum output when the waterwheel 212, the shroud 226, booster jets 244 and the chute 214, as well as the other components in the system, are positioned at a proper height with respect to each other and with respect to the headwater I and the tailwater II. The waterwheel-driven generator unit 202 includes various height control cables 236, platform 228 and winches 238 used to adjust the height of the shroud 226 and the chute 214. The control cables 236, platform 228 and winches 238, as well as their most efficient levels of operation, are similar to the control cables, platform, winches and efficient levels of operation disclosed in the inventors' own U.S. Pat. No. 5,440,175.

While the preferred embodiments have been shown and described, it will be understood that there is no intent to limit the invention by such disclosure, but rather, is intended to cover all modifications and alternate constructions falling within the spirit and scope of the invention.

What is claimed is:

1. An electric power-generating assembly at waterway locations without an existing dam, comprising:
   a sill wall constructed within the bed of the waterway;
   at least one waterwheel-driven generating unit supported directly downstream of the sill wall, the at least one waterwheel generating unit including a waterwheel, a chute and an electric generating unit;

the electric generator unit mounted axially within the waterwheel, and including a rotor disposed axially within a stator and drive means operably connecting the waterwheel to the rotor;

the chute includes an upstream end pivotally secured to the sill wall and a downstream end supported on the waterwheel, the downstream end of the chute clearing the circular path defined by an outer edge of the waterwheel when the waterwheel is rotating, the downstream end of the chute includes wheels which ride upon the waterwheel.

2. The electric power generating assembly according to claim 1, wherein the waterwheel-driven generating unit includes a shroud secured adjacent a downstream side of the waterwheel.

3. The electric power generating assembly according to claim 1, wherein components of the electric generating unit are supported by a carriage sealed within the waterwheel, and the carriage may be withdrawn from the waterwheel.

4. The electric power generating assembly according to claim 1, wherein the waterwheel-driven generating unit includes a booster jet.

5. A waterwheel-driven generating unit used with an electric power-generating system assembly, comprising:

a rotatable waterwheel supported by means for selectively vertically lifting the rotatable waterwheel, a chute including an upstream end pivotally secured to a support and a downstream end supported on, and in contact with, the waterwheel; and an electric generating unit mounted axially within the waterwheel, and including a rotor disposed axially within a stator and drive means operably connecting the waterwheel to said rotor.

6. The waterwheel-driven generating unit according to claim 5, wherein the means for selectively lifting includes a guide frame which selectively raises and lowers the waterwheel to control the volume of water entering the waterwheel.

7. The waterwheel-driven generating unit according to claim 6, wherein the guide frame selectively lifts the waterwheel between a fully raised position where no water flows onto the waterwheel and a fully lowered position where the waterwheel is inoperative.

8. The waterwheel-driven generating unit according to claim 6, wherein the guide frame includes first and second columns coupled to opposite ends of the waterwheel.

9. A waterwheel-driven generating unit used with an electric power-generating system assembly, comprising:

a rotatable waterwheel including a sealed internal space, a chute including an upstream end pivotally secured to a support and a downstream end supported on the waterwheel; and an electric generating unit mounted axially within the internal space of the waterwheel, and including a rotor disposed axially within a stator and drive means operably connecting the waterwheel to said rotor; and wherein the electric generating unit includes components, the components being supported by a wheeled carriage sealed within an internal frame of the waterwheel, and the internal frame includes rails upon which the wheeled carriage rides such that the carriage may be selectively withdrawn from the waterwheel by wheeling the carriage from within the internal frame.

10. The waterwheel-driven generating unit according to claim 9, wherein the carriage is supported for movement on a runway rail mounted within the waterwheel.

11. The waterwheel-driven generating unit according to claim 9, wherein the components include a speed increaser and a generator.

12. The waterwheel-driven generating unit according to claim 9, wherein the internal space is selectively accessed through a watertight door.

13. The waterwheel-driven generating unit according to claim 12, wherein the carriage is supported for movement on a runway rail mounted within the waterwheel such that the carriage moves through the watertight door onto an external runway.

14. A waterwheel-driven generating unit used with an electric power-generating assembly, comprising:

a rotatable waterwheel;

a chute including an upstream end pivotally secured to a support and a downstream end supported on the waterwheel;

at least one booster jet, separate and distinct from the chute, the at least one booster jet including an inlet through which a flow of water enters the at least one booster jet and a downstream end from which the water exits the booster jet, the downstream end being located adjacent the waterwheel at a position apart from the downstream end of the chute for directing streams of high pressure water to the waterwheel thereby supplementing the flow created at the downstream end of the chute; and an electric generating unit mounted axially within the internal space of the waterwheel, and including a rotor disposed axially within a stator and drive means operably connecting the waterwheel to said rotor.

15. The electric power generating assembly according to claim 14, wherein the waterwheel-driven generating unit operates in an overshot mode.

16. The electric power generating assembly according to claim 14, wherein the waterwheel-driven generating unit operates in a pitchback mode.

17. The electric power generating assembly according to claim 14, wherein the booster jet directs streams of high pressure water against a low point of travel of the waterwheel.

18. The electric power generating assembly according to claim 14, wherein the booster jet includes adjustment means for maintaining the booster jet adjacent the water wheel.

19. The electric power generating assembly according to claim 18, wherein means for maintaining includes a spring loaded adjustment sleeve attached to a first end of the booster jet.

* * * * *